United States Patent [19]

Galasso et al.

[11] Patent Number: 4,671,997

[45] Date of Patent: Jun. 9, 1987

[54] GAS TURBINE COMPOSITE PARTS

[75] Inventors: Francis S. Galasso, Manchester; Richard D. Veltri, East Hartford, both of Conn.

[73] Assignee: United Technologies Corporation, Hartford, Conn.

[21] Appl. No.: 721,249

[22] Filed: Apr. 8, 1985

[51] Int. Cl.$^4$ .................. B32B 9/00; B32B 19/00
[52] U.S. Cl. .................... 428/408; 428/698; 428/446; 428/902
[58] Field of Search ............ 428/408, 698, 215, 446, 428/699, 902

[56] References Cited

U.S. PATENT DOCUMENTS

| | | | |
|---|---|---|---|
| 2,681,876 | 6/1954 | De Santis et al. | 428/698 X |
| 2,929,741 | 3/1960 | Steinberg | 428/698 X |
| 2,972,556 | 2/1961 | Urahiotes | 428/698 X |
| 2,992,127 | 7/1961 | Jones | 428/408 |
| 3,073,717 | 1/1963 | Pyle et al. | 428/698 X |
| 3,120,453 | 2/1964 | Fietzer et al. | 428/408 X |
| 4,476,178 | 10/1984 | Veltri et al. | 428/215 |
| 4,515,860 | 5/1985 | Holzl | 428/408 |
| 4,535,035 | 8/1985 | Smialek et al. | 428/698 |

Primary Examiner—Nancy A. Swisher
Attorney, Agent, or Firm—A. Dean Olson

[57] ABSTRACT

Gas turbine engine carbon-carbon composite components having multilayer coatings resulting in components resistant to oxidation at temperatures greater than 2500° F. A first multilayer coating comprises a pack derived silicon carbide coating covered with a chemical vapor deposition layer of silicon nitride. A second multilayer coating comprises a layer of pyrolytic graphite covered with a pack derived silicon carbide coating covered with a chemical vapor deposition layer of silicon nitride. The third multilayer coating comprises a layer of chemical vapor deposition applied silicon carbide covered with a pack derived silicon carbide coating covered with a chemical vapor deposition layer of silicon nitride. Carbon fibers are carbonized or graphitized, formed into woven structures which are stacked in a prepreg with impregnating resin, pyrolyzed and optionally graphitized to form an engine component, and then coated with the above-described layers to achieve an engine component highly resistant to oxidation at elevated temperatures.

3 Claims, No Drawings

GAS TURBINE COMPOSITE PARTS

DESCRIPTION

1. Technical Field

The field of art to which this invention pertains is gas turbine engine components and specifically composite materials specifically adapted for use in gas turbine engines.

2. Background Art

The cost, reliability and performance of gas turbine engines is strongly influenced by the high temperature materials used in their construction. Current aircraft, ground-based vehicle and ship propulsion gas turbines, as well as stationary power generation turbines all use metal superalloys to provide needed high temperature performance. Used in polycrystalline or single crystal forms, these metals impose several important penalties on the overall gas turbine. These alloys are high density metals and thus they contribute to overall engine weight and can penalize the engine thrust to weight ratio. The densities of the most significant elements used in these alloys are typically between 7 to 9 grams per cubic centimeter ($g/cm^3$).

These high density materials contribute to high stresses when used in rotating parts of gas turbine engines. These stresses limit rotor speeds and particularly limit the fatigue life of high temperature discs. In addition, these metal superalloys are very costly and in many cases are available only from limited sources of supply.

In addition, at very high temperatures, these metal superalloys find limited use because of propensity to creep under applied stress. Current attempts to increase engine efficiency have caused the operating temperatures to be increased beyond those sustainable by these metals alone. Hence they require cooling by low temperature air which is forced through passages in the blades. This is done at penalty to overall engine efficiency.

Another attempt to develop high temperature gas turbine materials has centered on carbon fiber reinforced carbon matrix composites. These materials provide two major advantages over the above metals. First, they are very low in density (2.0 $g/cm^3$) and second, they maintain strength and toughness to extremely high temperatures. Unfortunately, carbon is easily oxidized at the elevated temperatures present in a gas turbine, and the utility of these materials hinges on the development of coatings and oxidation inhibitors. For example, commonly assigned U.S. Pat. No. 4,472,476, the disclosure of which is incorporated by reference, discloses coating resistant to oxidation up to 2500 degrees Fahrenheit (°F.). However, even greater engine efficiencies could be attained if higher use temperatures for such composite parts were available.

Accordingly, there has been a constant search in this art for lightweight engine components that maintain strength and toughness to extremely high temperatures.

DISCLOSURE OF INVENTION

The present invention is directed to oxidation resistant carbon-carbon turbine engine composite components. The carbon-carbon engine composite components have a packed derived silicon carbide coating which is integral with the carbon-carbon composite and has a thickness of about 0.04 mil to 30 mils and a chemical vapor deposition (CVD) applied layer of silicon nitride on the outer surface of the silicon carbide layer which has a thickness of from about 3 mils to about 30 mils. These coated carbon-carbon gas turbine engine composite components are substantially resistant to oxidation when exposed to temperatures greater than 2500° F.

Another aspect of this invention includes a second carbon-carbon gas turbine engine component composite which is highly resistant to oxidation at elevated temperatures. The carbon-carbon engine component composite has a layer of pyrolytic graphite bonded to the carbon-carbon composite having a thickness of from about 1 mil to about 5 mils. In addition, the carbon-carbon component has a packed derived silicon carbide coating having a thickness of from about 0.04 mil to about 30 mils and a CVD applied layer of silicon nitride on the outer surface of the silicon carbide layer which has a thickness of from about 3 mils to about 30 mils. These gas turbine engine components are substantially resistant to oxidation when exposed to temperatures greater than 2500° F.

Yet another aspect of this invention is a third carbon-carbon gas turbine engine component that is highly resistant to oxidation at elevated temperatures. The carbon-carbon engine component composite has a layer of CVD applied silicon carbide bonded to the carbon-carbon composite having a thickness of from about 0.5 mil to about 5 mils and a pack derived silicon carbide coating having a thickness of from about 0.04 mil to about 30 mils. In addition, there is a CVD applied layer of silicon nitride on the outer surface of the pack derived silicon carbide layer having a thickness from about 3 mils to about 30 mils. This gas turbine engine component is substantially resistant to oxidation when exposed to temperatures greater than 2500° F.

The coated composites according to the present invention provide gas turbine engine components that are low in density, strong and tough at extremely high temperatures, and resistant to oxidation at elevated temperatures. Thus it provides a significant advance in technology to the aerospace industries.

The foregoing and other features and advantages of the present invention will become more apparent in light of the following description.

BEST MODE FOR CARRYING OUT THE INVENTION

The materials utilized in the practice of this invention are composites, although all of the composite elements are comprised essentially of carbon in its various allotropic forms. Carbon-carbon materials are produced starting with organic precursor fibers such as polyacrylonitrile, rayon or pitch. Such fibers are usually produced in bundles (yarn), often by an extrusion process. The precursor fibers are heated in an inert atmosphere to pyrolyze or carbonize them and may then be heated to a higher temperature (e.g. 4,000° F., 2204° C.) to form graphite fibers. These carbon or graphite materials may then be laid down, woven, or interleaved to form what are referred to as 1D, 2D, 3D, ... nD etc. structures where D stands for direction and n stands for number of directions (i.e. in a 2D structure fibers are laid in two (typically orthogonal) directions).

These woven structures can then be cut to the length and width desired to form a gas turbine engine component, such as a vane, and then stacked in a die or mold for treatment. The woven structures can be stacked with alternate layers of a resin or pitch material or preferably the woven structures may be first impregnated with the resin, typically under pressure, and then stacked in the mold. The material is pyrolyzed and sometimes graphitized. Optional repeated impregnation steps followed by pyrolysis and graphitization steps can be employed to increase density. An alternative processing scheme is to use CVD to deposit pyrolytic graphite to densify the structure. Suitable carbon-carbon composites are also available from Hitco Corporation (Gardenia, Calif.).

The molded engine component is over 90% carbon, but by virtue of the fiber alignment and other processing details such as densification, has exceptional mechanical properties when compared with other carbon type materials. Preferably, the engine component is then machined to attain the close tolerances required by part specifications. The carbon-carbon composite then has several coatings applied to it as described below, and in applicants' commonly assigned U.S. Pat. No. 4,472,476.

The initial silicon carbide conversion coating has a thickness of about 0.04 mil to about 30 mils and preferably about 1 mil to about 10 mils. Such a coating can be provided by surrounding the article to be coated with a packed powder mixture containing (nominally) 10% aluminum oxide, 60% silicon carbide and 30% silicon, and heating the pack (an article) at about 1600° C. for 2 hours to 20 hours. An improved silicon carbide conversion coating results when 0.1% to 3% and preferably 0.3% to 1.5% boron is included in the pack mixture. This is described in commonly assigned U.S. Pat. No. 4,476,164 the disclosure of which is hereby incorporated by reference. It is believed that other pack mixtures can also be devised which will produce and equivalent silicon carbide coating.

An added coating constituent of a preliminary layer of pyrolytic graphite can be applied to the carbon-carbon composite prior to applying the silicon carbide conversion coating in certain circumstances. Such a layer having a thickness of about 1 mil to about 5 mils may be produced by flowing a mixture of gases (methane and argon in a 4:1 ratio) over the surface while the surface is heated to a temperature of about 1800° C. in a reaction chamber which is maintained at a pressure of 10 torr to 25 torr. Such a pyrolytic graphite coating is specially useful in connection with substrates which are not 100% dense, do not have a pyrolytic graphite matrix, and on those substrates having a positive coefficient of thermal expansion. The graphite layer provides a uniform surface condition so that a silicon carbide conversion coating of uniform quality can be produced minimizing differences in starting materials. A concept of using an initial pyrolytic graphite layer when coating carbon-carbon composites is described in commonly assigned application Ser. No. 391,614 now abandoned by Veltri and Galasso entitled "Pyrolytic Graphite Pretreatment for Carbon-Carbon Composites" the disclosure of which is hereby incorporated by reference.

Alternatively, a thin layer of CVD silicon carbide may be applied as an initial layer prior to applying a silicon carbide conversion coating by the packed process described above. Such a layer provides substantial benefits when coating substrates have a small or negative coefficient of thermal expansion. The use of a preliminary CVD silicon carbide coating is the subject of commonly assigned U.S. Pat. No. 4,425,407.

Preferred conditions for depositing CVD silicon carbide on the surface of the carbon-carbon material are to heat the substrate to a temperature of between about 1000° C. and about 1200° C. while maintaining the substrate in a reduced pressure chamber at a pressure of 2 torr to 20 torr while flowing a mixture of methane, hydrogen, and methyl dichlorosilane over the surface of the sample. The preferred ratio of methane to hydrogen to methyl dichlorosilane is about 100-100:14 (although ratios of about 60-140:60-140:10-20 appear feasible). In the case of a small chamber having a two inch (5.08 centimeter) inside diameter and four inch (10.1 centimeter) length, 100 cubic centimeters per minute ($cm^3$/min) of methane and hydrogen and 13.6 $cm^3$/min of methyl dichlorosilane were flowed through the chamber to produce the desired coating. A coating of from 0.1 mil to 5 mils and preferably 0.5 to 3 mils can be produced in about 1 hour to about 4 hours under the described conditions. As in the case of the pyrolytic graphite preliminary layer, the thickness of the subsequently deposited silicon carbide conversion layer preferably exceeds the thickness of the CVD silicon carbide layer.

The outer coating of CVD silicon nitride is the next coating to be applied to the gas turbine engine component. The process described in commonly assigned U.S. Pat. No. 3,226,194, the disclosure of which is hereby incorporated by reference, is an exemplary process. Briefly, this patent describes a method for depositing pyrolytic silicon nitride on a substrate by maintaining the substrate at an elevated temprature, e.g. 1500° C., and passing a gaseous mixture containing silicon tetrafluoride and ammonia over the substrate. Preferably, the gas contains about 75% ammonia and the partial pressure of the reactant gases is maintained less than about 100 millimeters (mm) of mercury.

The silicon tetrafluoride, other silicon halides or silane, can be reacted with ammonia or nitrogen on the hot substrate surfaces to produce an amorphous or a silicon nitride coating. While the silicon tetrafluoride-ammonia reaction is best performed at 1400° C. to 1600° C., the reaction of silane with nitrogen containing gases can be run at lower temperatures. These processes may readily be used to apply silicon nitride to carbon-carbon materials which have previously received a SiC conversion coating. For the purposes of this invention, a coating thickness of about 3 mils to about 30 mils, and preferably 10 mils to 20 mils is employed. The coated article thus produced is adapted to resist oxidation under severe conditions.

EXAMPLE 1

A multilayer oxidation resistant coating was applied to a carbon-carbon composite in the following manner. The first layer consisted of a one to three mil coating of pyrolytic graphite. This coating was applied within a furnace in which the reaction zone was maintained at a temperature of 1800° C. and an absolute pressure of less than 4 torr. Into this zone a gas mixture consisting of 500 cubic centimeters per minute (cc/min) of methane and 100 cc/min of argon was introduced. These gas flows, temperature, and pressures were maintained for two hours. After this time the methane flow was first stopped and the furnace then slowly cooled to room temperature under the flow of 100 cc/min or argon.

The next layer was a silicon carbide coating of one to two mils thickness applied via a vapor transport pack diffusion process. For this coating layer the sample was surrounded by a powder mixture and placed in a graphite crucible with a loose fitting lid. The powder mixture consisted of (by weight) nominally 10% alumina, 60% silicon carbide, 30% silicon and 0.5% boron. The graphite crucible thus loaded was placed in a high temperature furnace and heated to 1760° C. for five hours. The furnace was allowed to cool overnight and the next day the crucible was removed from the furnace and the sample extracted from within the pack mixture.

Having applied the silicon carbide coating via the diffusion process the final and outer coating of silicon nitride was applied to this sample by a chemical vapor deposition process. In this process the sample was placed in a reactor which in turn was placed within a high temperature furnace. The furnace was heated such that the temperature within the reactor was 1450° C. With large mechanical pumps and proper valves, pressure within the reactor was maintained at less than 2 torr. When the temperature of the reactor and the absolute presure had both stabilized at the desired level, the gases of silicon tetrafluoride and ammonia were introduced. The flow rates were 60 cc/min of silicon tetrafluoride and 450 cc/min of ammonia over a period of about 4 hours. After cooling the furnace to room temperature the reactor was opened and the sample re-positioned to avoid shadowing. The entire silicon nitride deposition procedure was then repeated three times. A final uniform thickness of 15 mils to 20 mils of silicon nitride was obtained on the carbon-carbon composite. The sample thus prepared labeled A was tested for oxidation resistance and the results are included in Table I below.

The completed engine component may take the form of most parts used in a gas turbine engine preferably those components exposed to elevated temperatures of up to 3500° F. It is especially preferred that the engine component is a core engine component. Representative core engine components include those in the compressor section of the gas turbine, the turbine section, the combustor section and the afterburner (augmentor) section. Examples of such components include: blades—both compressor and turbine; vanes—both compressor and turbine; disks to retain the above mentioned blades or ceramic or metal blades; sideplates to prevent inefficient air bleed through turbine stages; abradable outer air seal shoes; combustor liners; afterburner internal flaps and seals; and burner and turbine case structures as well as other thin walled structures subjected to high temperatures. Although this disclosure has been primarily directed to gas turbine engines, it would be known to those skilled in the art to fashion similar coated components for other high temperature applications.

Engine components of these materials are extremely resistant to oxidation. In fact, the thus coated carbon-carbon engine components are resistant to oxidation at temperatures above 2500° F. to approximately 3500° F. as detailed by the following table. The insignificant percent weight change is indicative of the superior oxidation resistance. Although there was no significant percent change in weight at 3500° F., there were signs of bubbling on the component surface.

TABLE I

| Sample | Engine Component Oxidation Resistance | | |
|---|---|---|---|
| | Test Temp. °F. | Time (Minutes) | % Weight Change |
| A | 3000 | 15 | −.08 |
| | 3500 | 15 | +.32 |
| B | 3000 | 15 | +.05 |
| | 3400 | 30 | +.14 |
| C | 3000 | 15 | 0 |
| | 3500 | 120 | −.24 |
| D | 3100 | 300 | −.05 |
| | | 600 | −.01 (+.02) No Change |

This invention provides a significant advance to the aerospace industry. It lowers the weight of engines thus increasing the thrust to weight ratio, and at the same time provides components which are thermally stable up to temperatures of 3500° F. Thus it sets the stage for the next generation of gas turbine engines.

Although the invention has been shown and described with respect to detailed embodiments, it should be understood by those skilled in the art that various changes and omissions in form and detail may be made therein without departing from spirit and scope of the invention.

I claim:

1. In a gas turbine engine environment wherein a carbon-carbon composite is used, said composite having a pack derived silicon carbide coating bonded to the carbon-carbon composite, and a chemical vapor deposition applied layer of silicon nitride on the outer surface of the silicon carbide layer, the silicon nitride layer having a thickness of from about 3 mils to about 30 mils, the improvement comprising the silicon carbide coating having a thickness from about 0.04 mil to about 30 mils and the gas turbine engine component carbon-carbon composite layer being substantially resistant to oxidation at operation temperatures greater than 2500° F.

2. In a gas turbine engine environment wherein a carbon-carbon composite is used, said composite having a layer of pyrolytic graphite bonded to the carbon-carbon composite, the pyrolytic graphite layer having a thickness of from about 1 mil to about 5 mils, a pack derived silicon carbide coating on the outer layer of the pyrolytic graphite layer, and a chemical vapor deposition applied layer of silicon nitride on the outer surface of the silicon carbide layer, the silicon nitride layer having a thickness of from about 3 mils to about 30 mils, the improvement comprising the silicon carbide coating having a thickness from about 0.04 mil to about 30 mils and the gas turbine engine component carbon-carbon composite layer being substantially resistant to oxidation at operation temperatures greater than 2500° F.

3. In a gas turbine engine environment wherein a carbon-carbon composite is used, said composite having a layer of chemical vapor deposition applied silicon carbide bonded to the carbon-carbon composite, the silicon carbide layer having a thickness of from about 0.5 mil to about 5 mils, a pack derived silicon carbide coating on the outer surface of the silicon carbide coating, and a chemical vapor deposition applied layer of silicon nitride on the outer surface of the pack derived silicon carbide coating, the silicon nitride layer having a thickness of from about 3 mils to about 30 mils, the improvement comprising the pack derived silicon carbide coating having a thickness of from about 0.04 mil to about 30 mils and the gas turbine engine component carbon-carbon composite layer being substantially resistant to oxidation at operation temperatures greater than 2500° F.

* * * * *